(12) United States Patent
Moeller et al.

(10) Patent No.: US 7,682,477 B2
(45) Date of Patent: Mar. 23, 2010

(54) RADIATION CROSS-LINKABLE HOT-MELT CONTACT ADHESIVES

(75) Inventors: Thomas Moeller, Duesseldorf (DE); Holger Toenniessen, Niederzier (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 0 days.

(21) Appl. No.: 11/836,296

(22) Filed: Aug. 9, 2007

(65) Prior Publication Data

US 2008/0039594 A1     Feb. 14, 2008

Related U.S. Application Data

(63) Continuation of application No. PCT/EP2006/000172, filed on Jan. 11, 2006.

(30) Foreign Application Priority Data

Feb. 10, 2005     (DE) ................. 10 2005 006 282

(51) Int. Cl.
- *C09J 163/08* (2006.01)
- *C09J 5/06* (2006.01)
- *C09J 109/00* (2006.01)
- *C09J 123/30* (2006.01)

(52) U.S. Cl. ............... 156/275.5; 156/275.7; 156/330; 522/110; 522/111; 522/129; 522/31

(58) Field of Classification Search ............... 522/110, 522/111, 31, 129; 156/175.5, 275.7; 428/345
See application file for complete search history.

(56) References Cited

U.S. PATENT DOCUMENTS

| 5,436,063 | A | * | 7/1995 | Follett et al. ............. 442/73 |
| 5,516,824 | A |   | 5/1996 | Masse et al. |
| 5,766,277 | A | * | 6/1998 | DeVoe et al. ............. 51/295 |
| 6,077,601 | A | * | 6/2000 | DeVoe et al. ............. 428/323 |
| 7,163,968 | B2 | * | 1/2007 | Erickson ............. 522/158 |
| 7,488,539 | B2 | * | 2/2009 | Kozakai et al. ............. 428/447 |
| 2003/0190467 | A1 |  | 10/2003 | Husemann et al. |
| 2005/0165164 | A1 |  | 7/2005 | Moeller et al. |

FOREIGN PATENT DOCUMENTS

| DE | 102 343 69 A1 | 2/2004 |
| EP | 0 882 775 A1 | 12/1998 |
| EP | 0 564 050 B1 | 8/1999 |
| EP | 1 130 070 A2 | 9/2001 |
| EP | 0 946 600 B1 | 8/2002 |
| EP | 0 516 203 B1 | 9/2002 |
| EP | 1 217 011 B1 | 10/2005 |
| WO | WO 94/00499 A1 | 1/1994 |
| WO | WO 96/11241 A2 | 4/1996 |
| WO | WO 97/41170 A1 | 11/1997 |
| WO | WO 00/00566 A1 | 1/2000 |
| WO | WO 00/22062 A1 | 4/2000 |
| WO | WO 00/27942 A1 | 5/2000 |
| WO | WO 01/55276 A1 | 8/2001 |
| WO | WO 02/10307 A2 | 2/2002 |
| WO | WO 03/002684 A1 | 1/2003 |

OTHER PUBLICATIONS

International Search Report for WO 2006/084537 A3 (Aug. 17, 2006).
"Standard Test Method for Apparent Viscosity of Hot Melt Adhesives and Coating Materials", ASD3236-88, pp. 1-8 (2004).

* cited by examiner

*Primary Examiner*—Susan W Berman
(74) *Attorney, Agent, or Firm*—Woodcock Washburn LLP

(57) ABSTRACT

The invention relates to a radiation crosslinkable hot melt pressure sensitive adhesive comprised of a radiation crosslinkable polymer as component (A) based on epoxidized polyolefins, wherein the epoxy groups are not consolidated in blocks; a tackifying resin possessing no epoxy groups as component (B); optionally a low molecular weight oligomer as component (C) that possesses reactive groups that can react with the epoxy groups of component (A); and an additive comprising a photo initiator as component (D).

19 Claims, No Drawings

RADIATION CROSS-LINKABLE HOT-MELT CONTACT ADHESIVES

CROSS REFERENCE TO RELATED APPLICATIONS

This application is a continuation of PCT/EP06/000172, filed Jan. 11, 2006, which claims the benefit of DE 10 2005 006 282.2, filed Feb. 10, 2005, the complete disclosures of which are hereby incorporated by reference in their entirety.

FIELD OF THE INVENTION

The invention relates to radiation crosslinkable hot melt pressure sensitive adhesives as well as to their manufacture and use.

BACKGROUND OF THE INVENTION

Hot melts are generally understood to be room temperature-solid to waxy and solvent-free adhesives that are applied from the melt onto the parts to be glued together and after assembly physically set by solidifying on cooling.

Hot melt pressure sensitive adhesives (HMPSA) belong to the group of hot melt adhesives, remain permanently tacky and adherent on cooling and with slight contact pressure stick immediately to almost all substrates.

Hot melt pressure sensitive adhesives are widely used in industry and are employed for example in the beverage industry for labeling, in the packaging industry, in the graphic arts industry, for example in bookbinding, or for manufacturing disposable articles, for example, articles of hygiene, such as baby diapers.

The critical advantage of pressure sensitive hot melt adhesives is that they allow a solventless application. Thus, cost intensive intermediate drying steps are obviated. As solvent-containing adhesive systems are obliged to conform to increasingly more stringent environmental regulations, hot melt pressure sensitive adhesives also offer advantages from the ecological point of view.

Hot melt pressure sensitive adhesives based on polyacrylates are known. Thus, WO 02/10307 describes pressure sensitive adhesive compounds that consist of block copolymers, e.g., copolymers of acrylates, isoprene and styrene, for the manufacture of adhesive tapes. In addition, in one embodiment a component is comprised of an unsaturated group that is suitable for radiation chemical crosslinking. These pressure sensitive adhesive compounds crosslink by means of radical polymerization of olefinic double bonds.

In WO 00/027942, radiation curable pressure sensitive hot melt adhesives are described for coating labels at low temperature. However, these adhesives are semi-liquid at room temperature and are crosslinked by radiation curing after application. This involves a radical crosslinking of olefinically unsaturated polymers.

WO 00/22062 describes radiation crosslinkable adhesives that comprise block copolymers containing at least one butadiene block with a 1,2-vinyl content of at least 25%. As a result of the presence of olefinic double bonds, these adhesives can likewise be crosslinked by photo initiator radiation curing.

Radiation curable adhesives that can be applied at low temperature are described in WO 01/55276. They comprise block copolymers, wherein one block is formed from polyvinyl-aromatic building blocks and a second block is a polydiene block with vinyl functionality.

Furthermore, EP 1130070 describes radiation crosslinkable adhesives for coating heat shrinkable films or labels. These adhesives can consist of epoxidized block copolymers and/or cycloaliphatic epoxides with olefinic double bonds, a photo initiator, a tackifying resin, as well as further additives. Moreover, polymers can include olefinic double bonds or even unreactive copolymers based on isoprene or isobutylene. Crosslinking through crosslinking groups such as epoxy groups or through double bonds is described. A more exact limitation of the epoxidized block copolymer is not provided.

Disadvantages of the prior art are that for specific applications, pressure sensitive hot melt adhesives with the lowest possible viscosity in processing conditions are not yet available. This property is predominantly influenced by the choice of the polymer for the hot melt adhesive. A further disadvantage of hot melt adhesives according to the prior art is an inadequate initial adhesion with concomitant high heat stability of the joint, which is required for certain application purposes.

SUMMARY OF THE INVENTION

The object of the present invention is to provide a hot melt pressure sensitive adhesive with a low viscosity at the application temperature, which thereby affords a high initial adhesion and a rapid crosslinking, and thus produces an increased adhesion and cohesion to the substrates. The application temperature should be low enough such that the substrates are not damaged. In particular, these hot melt pressure sensitive adhesives should be suitable for adhering shrinkable materials such as labels that are then directly subjected to a shrink process.

DETAILED DESCRIPTION OF ILLUSTRATIVE EMBODIMENTS

The object is achieved by a radiation crosslinkable hot melt pressure sensitive adhesive, comprising 15 to 89.99 wt. % of at least one radiation crosslinkable polymer as component (A) based on epoxidized polyolefins, wherein the epoxy groups are not grouped together in blocks, 10 to 85 wt. % of at least one tackifier resin exempt from epoxy groups as component (B), 0 to 20 wt. % of at least one low molecular weight oligomer as component (C), wherein the oligomer possesses reactive groups that can react with the epoxy groups of component (A), as well as 0.01 to 30 wt. % additives as component (D), wherein the sum should be 100%.

Various polymers can be employed as component (A). They should have a molecular weight greater than 1000. The polymers comprise a plurality of epoxy groups. Epoxy groups can be directly polymerized into the polymers during their manufacture, however, they can also be reacted into the starting polymers or be produced in the polymers. This can be accomplished if suitable starting polymers possess olefinic double bonds that can be converted into epoxy groups by known processes. Moreover, it is also possible to convert other functional groups of the starting polymer, e.g., OH groups with suitable compounds containing glycidyl compounds.

Suitable starting polymers are, for example, those with elastomeric properties, which can be stretched and which essentially recover their initial dimensions immediately after removal of the elongation. In the context of the invention, starting polymers for manufacturing component (A) can be selected from the group of elastomeric acrylate, polyester-polyurethane, ethylene-acrylate, butyl rubber, natural rubber, styrene copolymers, singly or in mixture, wherein the copolymers concern statistical, alternating, graft or block copolymers. According to the invention, elastomer alloys, especially EPDM/PP, NR/PP and NBR/PP as well as polyurethanes, polyether esters and polyether amides, can also be employed.

Further examples of starting polymers are thermoplastic elastomers (TPE), which are well known in the prior art. By these are understood polymers, also known as thermoplastic rubbers, that in the ideal case exhibit a combination of the end use properties of elastomers and the processing properties of thermoplastics. This can be achieved if soft and elastic segments with high elasticity and low glass transition temperature as well as hard crystallizable segments with low elasticity, high glass transition temperature and tendency for association are present in the relevant polymers. According to the invention, such thermoplastic elastomers are especially selected from the group of styrene block polymers, for example, styrene diene copolymers (SBS, SIS), styrene ethylene/butylene copolymers (SEBS) or styrene ethylene/propylene styrene copolymers (SEPS, SEP SEEPS).

Further exemplary polymers that are suitable for use as the starting polymer for component (A) are homo- or copolymers of 1,3-butadiene, 2-methyl-1,3-butadiene (isoprene), 1,3-pentadiene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene and 2,3-dimethyl-1,3-decadiene, 2-methyl-1,3-cyclopentadiene, 2-methyl-1,3-cyclohectadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene and 2-chloro-1,3-cyclohexadiene.

The abovementioned starting polymers can comprise a plurality of unsaturated double bonds. These can be present in the polymer backbone and/or in the side chains. In particular, no long chain branched or star shaped polymers should be present; rather the double bonds can be present in short side chains, particularly as vinyl functional groups. These double bonds are reacted, at least partially, according to known processes such that the starting polymers are provided with epoxy groups. In the context of the invention, the epoxy group-containing polymers obtained in this way are suitable as component (A). Further suitable starting polymers can comprise functional groups such as, e.g., OH groups. They can then be reacted with low molecular weight compounds that contain glycidyl groups, thus affording polymers suitable as component (A).

It is critical for component (A) that the suitable polymers do not exhibit the epoxy groups as one or a plurality of blocks, e.g. two blocks. Preferably the epoxy groups should be statistically distributed over the total length of the molecular chain. In a further preferred embodiment the polymers are linear in form.

Epoxidized homo- or copolymers of 1,3-butadiene, of 1,3-pentadiene, of cyclopentadiene, especially also of isoprene, are particularly suitable as component (A). In one embodiment, these can also be copolymerized with additional monomers such as, e.g., styrene. It is possible that even further functional groups such as OH groups can be present at the polymer chain end or in side chains. In a particular embodiment of the invention, however, component (A) comprises only epoxy groups as well as optional additional functional groups that are unreactive with the epoxy groups, such as, for example, double bonds. The hydroxyl number of such polymers is, for example, less than 50 mg KOH/g, particularly less than 20 mg KOH/g, and preferably less than 10 mg KOH/g. In a preferred embodiment, only terminal OH groups are present on the chain; a further particularly preferred embodiment is free from OH groups.

The molecular weight of the binding agent of component (A) is between 1000-100,000 g/mol, preferably 1000-50,000 g/mol, particularly 5000-30,000 g/mol or 1300-3000 g/mol. In the context of this invention, the molecular mass/molecular weight is understood to mean the number average (Mn). This can be determined by known methods, for example, by gel permeation chromatography. Component (A) can be solid at room temperature, although viscous polymers are also preferred. The viscosity should be between 2000 mPas and 5,000,000 mPas at 20° C., preferably 3000 to 1,000,000 mPas at 30° C., particularly preferably 10,000 to 50,000 mPas at 38° C.

In the case of epoxy groups having been introduced by oxidation of double bonds, the number of epoxy groups can be from 1 to 100% of the original double bonds, particularly 10-80%. On average, the polymers should comprise at least two epoxy groups per molecule, preferably at least three. The content of epoxy groups is from 0.1 to 20 meq/g (milliequivalents/g), preferably from 0.2 to 15 meq/g, particularly 0.3 to 12 meq/g. Examples of such polymers are described in EP-A 1 217 011 or in EP-A 0 946 600.

The amount of component (A) should be 15-90 wt. %, particularly 20-60 wt. %. A plurality of polymers can also be present as component (A), although preferably at least 75% isoprene- or butadiene homo- or copolymers should be present.

The inventive hot melt pressure sensitive adhesive comprises at least one tackifying resin as component (B). The resin affords an additional tackiness and improves the compatibility of the hot melt pressure sensitive adhesive components. In particular, this concerns resins with a softening point from 70 to 140° C. (ring and ball method). For example, they are aromatic, aliphatic or cycloaliphatic hydrocarbon resins, as well as modified or hydrogenated versions thereof. Examples of these are aliphatic or alicyclic petroleum hydrocarbon resins and hydrogenated derivatives. Further resins that can be utilized in the context of the invention are:

a) hydroabietyl alcohol and its esters, particularly its esters with aromatic carboxylic acids such as terephthalic acid and phthalic acid, b) preferably modified natural resins such as resin acids from balsamic resin, tall oil rosin or wood rosin, e.g. completely saponified balsamic resin or alkyl esters of optionally partially hydrogenated colophonium with low softening points such as e.g. methyl, diethylene glycol, glycerine and pentaerythritol esters, c) terpene resins, particularly copolymers of terpene. Examples are: styrene-terpene, alpha-methyl styrene-terpene, phenol modified terpene resins, as well as their hydrogenated derivatives;

d) acrylic acid copolymers, preferably styrene-acrylic acid copolymers and e) reaction products based on functional hydrocarbon resins.

It is preferred to employ partially polymerized tall oil rosin, hydrogenated hydrocarbon resins or glycerol colophonium esters singly or in a mixture.

Component (B) has a low molecular weight of less than 1500 g/mol, especially below 1000. It can be chemically inert or optionally even comprise functional groups. Examples of such functional groups can be double bonds. However, epoxy groups are not present. In one embodiment these typical double bonds do not react with component (A). In a further embodiment however, optionally it is possible that reactive double bonds of component (B) can react with available double bonds of component (A). The amount of component (B) is 10-85 wt. %, particularly 25-65 wt. %.

Component (B) is selected such that it is compatible with component (A) and together with optionally present component (C). Compatibility is understood to mean that after mixing and homogenization of the ingredients, phase separation is not observed over a long period, for example, 8 hours at the application temperature.

Furthermore, additional low molecular weight oligomeric materials can be comprised as component (C) in the inventive hot melt pressure sensitive adhesive and can crosslink with component (A). These low molecular weight oligomeric materials involve compounds that possess reactive groups that can co-react in the epoxide crosslinking reaction. During the crosslinking reaction they influence the network, for example, difunctional compounds afford a chain extension, trifunctional compounds afford a branching or monofunctional compounds afford a chain termination. They are oligomeric compounds with a molecular weight of less than approximately 1000 g/mol. Preferably, they carry at least two reactive groups per molecule.

Component (C1) can be oligomers with epoxy groups or analogous groups. For example, they can be low molecular weight epoxidized butadiene oligomers or cycloaliphatic polyepoxides. Moreover, epoxidized natural oils and fats such as epoxidized soya oil, linseed oil, sunflower oil etc. can optionally be employed. Similarly, epoxidized reaction products of saturated oils and fats such as, for example, 2-ethylhexyl esters of epoxidized C14-C22 fatty acids are suitable as low molecular weight compounds. Likewise, resoles, novolaks, epoxy resins, glycidyl esters of carboxylic acids or glycidyl ethers can also be employed. These types of oligomers can also comprise oxetane groups as another functional group.

Besides the epoxy group-containing low molecular weight oligomeric compounds, low molecular weight oligomeric compounds that possess two or a plurality of functional groups that are reactive towards epoxy groups, especially polyols, are also suitable as component (C2). Such polyols are, for example, polyalkylene glycols such as polyethylene glycol or polypropylene glycol or also glycerine derivatives. Further polyol compounds can be low molecular weight polyester polyols, manufactured from aliphatic and/or aromatic di- or polycarboxylic acids with low molecular weight polyols.

In one embodiment, oligomeric vinyl ethers with a molecular weight of less than 1000 g/mol can also be present as component (C3). These vinyl ethers take part in the reaction during the epoxide crosslinking reaction.

The reactivity during crosslinking can be controlled by means of these reactive low molecular weight compounds. Furthermore, it is possible to chain extend the crosslinking chains by adding difunctional compounds or to obtain a denser crosslinking by adding polyfunctional groups.

In a preferred embodiment, compounds that carry at least two epoxy groups are employed as the low molecular weight oligomers (C1). They are preferably viscous. A further embodiment comprises at least one polyol containing at least two OH groups as the low molecular weight oligomeric compound (C2). The molecular weight of this compound should be between 200 and 1000 g/mol. However, mixtures of C1, C2 and C3 can also be employed.

Component (C) can be comprised in amounts of 0-20 wt. %, particularly 5-15 wt. %. Component (C) should be able to react with component (A). In this way, later on there remains no unwanted high amounts of migratable low molecular weight ingredients in the crosslinked hot melt pressure sensitive adhesive.

In the context of the present invention, the term "radiation crosslinkable" is understood to mean the initiation of a polymerization reaction of the epoxy groups under the influence of radiation. In particular, UV, electron beam (EB), short wave visible light, but also IR radiation, are suitable. With EB or UV irradiation, desired product properties can be controlled by the radiation dose, with IR radiation by the product temperature and the residence time. In the context of this invention, radiation crosslinking by UV or electron beam is preferred.

Irradiation of the inventive hot melt pressure sensitive adhesive with UV light preferably occurs at a wavelength in the range 100 nm to 380 nm. UV radiation is generally generated in gas discharge lamps, mercury arc lamps being particularly applicable. Suitable UV radiation dosages are 50-2000 J/cm2. A radiation dose of 10 to 100 kilogray (kGy) is preferred for electron beam irradiation of the inventive hot melt pressure sensitive adhesive. For the irradiation of the inventive hot melt pressure sensitive adhesive with UV light, the crosslinking can be controlled by not only the radiation dose but also by the addition of photo initiators, photo sensitizers or molecular weight regulators.

As further ingredients, additives that can influence specific properties of the adhesive can be comprised in the inventive hot melt pressure sensitive adhesive as component (D). These include, for example initiators, plasticizers, stabilizers, waxes, adhesion promoters or similar additives. The quantity should be at least 0.01 wt. %. A plurality of additives can also be incorporated as a mixture.

As such an additive, at least one photo initiator and/or photo sensitizer in a quantity of 0.1 to 10 wt. % is comprised in the radiation crosslinkable hot melt pressure sensitive adhesive. Where the adhesive according to the invention is irradiated with UV light, it comprises at least one photo initiator in the range of 0.1 to 10 wt. %, preferably 0.3 wt. % to 5 wt. %. In the context of the present invention, fundamentally any commercially available photo initiators for cationic polymerization are suitable, which are compatible, i.e., form at least substantially homogeneous mixtures, with the hot melt pressure sensitive adhesive according to the invention and which do not react with the functional groups under storage conditions.

The photopolymerization carried out according to the invention is a cationic photopolymerization. Here the photo initiators undergo molecule cleavage under the effect of the radiation and, at the same time, form free Lewis or Brönstedt acids. Preferred cationic photo initiators are, for example, the aryl diazonium salts known to the person skilled in the art, for example, diaryl iodonium salts or triaryl sulfonium salts or iodonium salts. The selection according to the reactivity and the radiation source is known to the person skilled in the art and possibly requires an adjustment in the quantity being added.

Examples of suitable photo initiators are commercially available under the names Omnirad BL 440, Omnirad 55, Omnipol TX, Sarcat CD 1010, Sarcat CD 1011, Cyracure UVI-6976, Cyracure UVI-6992 or UVI-6974, Rhodorsil 2074, Deuteron 1240.

Furthermore, additional photo sensitizers can be incorporated. Through the use of photo sensitizers, the absorption wavelengths of photopolymerization initiators can be shifted to shorter and/or to longer wavelengths and the crosslinking rate thus accelerated. The radiation of a certain absorbed wavelength is converted as energy onto the photopolymerization initiator. In the context of the invention, suitable photo sensitizers are, for example, acetophenone, thioxanthane, benzophenone and fluorescein and derivatives thereof.

In a further embodiment, radical photo initiators are also additionally present, which enable a reaction of olefinic double bonds of the various components. Such initiators are commonly used by the person skilled in the art.

In order to achieve the required performance properties such as, for example, cohesive strength, viscosity, softening point or setting rate, other additives may have to be incorporated in the adhesive formulation. These include plasticizers for increasing flexibility, stabilizers, antioxidants. In addition, fillers may be incorporated to increase tensile strength.

The plasticizer is preferably used for viscosity adjustment and is comprised in the hot melt pressure sensitive adhesive according to the invention in a concentration of generally 0 to 25% by weight, preferably 5 to 20% by weight.

Suitable plasticizers are medicinal white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof. Hydrogenated plasticizers are selected from the group of paraffinic hydrocarbon oils—commercially available, for example, under the trade name Primol® from Exxon.

Suitable polyisobutylenes are available under the name of "Parapol" from Exxon Chemicals or under the name of "Oppanol" from BASF. Preferred paraffin oils have a viscosity of 100 to 600 mPas at 25° C. They are obtainable as "Kaydol" from Witco or as Primol 352 from Esso. Monohydric or polyhydric alcohols with a molecular weight of 1000 to 6000 g/mol may also be used.

Esters are also suitable plasticizers, including, for example, liquid polyesters and glycerol esters, such as glycerol diacetate and glycerol triacetate as well as neopentyl glycol dibenzoate, glyceryl tribenzoate, pentaerythritol tetrabenzoate and 1,4-cyclohexanedimethanol dibenzoate. Preferably, plasticizers based on aromatic dicarboxylic acid esters are employed, i.e., the corresponding esters of phthalic acid, isophthalic acid or terephthalic acid. The alcohol component of these esters used as plasticizers normally contains 1 to 8 carbon atoms. Fatty acids are also suitable plasticizers, preferably fatty acids with 8 to 36 carbon atoms.

Waxes in quantities of 0 to 25% by weight may optionally be added to the hot melt pressure sensitive adhesive. The quantity is gauged so that, on the one hand, viscosity is reduced to the required range and, on the other hand, adhesion is not adversely affected. The wax may be of natural or synthetic origin. Suitable natural waxes are vegetable waxes, animal waxes, mineral waxes or petrochemical waxes. Suitable chemically modified waxes are hard waxes, such as montan ester waxes, sarsol waxes, etc. Suitable synthetic waxes are polyalkylene waxes and polyethylene glycol waxes. Preferred waxes are petrochemical waxes, such as petrolatum, microwaxes and synthetic waxes, particularly polyethylene waxes, polypropylene waxes, optionally PE or PP copolymers, Fischer-Tropsch resins, paraffin waxes or microcrystalline waxes.

In addition, typical auxiliaries and additives may be incorporated in the hot melt pressure sensitive adhesive according to the invention. Stabilizers are mentioned first and foremost in this regard. Their function is to prevent the reactive ingredients from entering into a premature reaction and to protect the polymers against decomposition during processing. Such stabilizers are, in particular, antioxidants. They are added to the hot melt pressure sensitive adhesive in quantities of typically about 0.1 to 1.0% by weight.

The stabilizers, more particularly UV stabilizers, initiators or antioxidants suitable for use as additives in accordance with the present invention include phosphites, phenols, sterically hindered phenols of high molecular weight, polyfunctional phenols, sulfur- and phosphorus-containing phenols. Suitable compounds in the context of the invention are, for example, hydroquinone, hydroquinone methyl ether or phenothiazine. The choice and the properties are known to the person skilled in the art.

Other additives may be incorporated in the hot melt pressure sensitive adhesive in order to vary certain properties. These other additives include, for example, dyes, such as titanium dioxide, fillers, such as talcum, clay and the like. However, in this case it must be ensured that the filler does not inhibit a penetration of the radiation into the adhesive and a reaction start.

The hot melt pressure sensitive adhesive can comprise as additional ingredients polymers that do not comprise reactive groups. These can be those polymers with a molecular weight greater than 1000 g/mol, which are described as the starting polymers of component (A). For example, the polymers are comprised from the group ethylene/n-butyl acrylate copolymers, ethylene/(meth)acrylic aid copolymers, amorphous polyolefins, for example, polypropylene homopolymers, propylene/butene copolymers, propylene/hexene copolymers and, in particular, amorphous poly-α-olefins (APAOs) produced by metallocene catalysis. Polyamides can also be used, which provide the hot melt pressure sensitive adhesive with optional additional flexibility, toughness and strength. Certain hydrophilic polymers may also be added, for example, polyvinyl methyl ether, polyvinyl pyrrolidone, polyethyl oxazolines, starch or cellulose esters, which, for example, increase the wettability of the adhesives.

In a preferred embodiment, portions of non-reactive polymers based on selected α-olefin copolymers are added. These copolymers are described in the literature. They are particularly suitable when they were manufactured by means of metallocene catalysis. Copolymers manufactured in this way are characterized by a narrow molecular weight distribution. They reinforce the hot melt adhesion properties of the inventive hot melt pressure sensitive adhesive.

The inventive hot melt pressure sensitive adhesive can comprise 0 to 30 wt. %, particularly 2-20 wt. % of these polymeric ingredients. The polymers are free of epoxy groups. The molecular weight is above 1000 g/mol, preferably above 10,000 g/mol.

In addition, the radiation-crosslinkable hot melt pressure sensitive adhesive according to the invention can contain adhesion promoters. Adhesion promoters are substances that improve the adhesion strength of the adhesive to the substrate. Typical adhesion promoters are, for example, ethylene/acrylamide comonomers, polymeric isocyanates, reactive organosilicon compounds or phosphorus derivatives. Such adhesion promoters are known to the person skilled in the art. They should be included in the adhesive in an amount of 0 to 10 wt. %, preferably 1 to 5 wt. %.

In a preferred embodiment, the hot melt pressure sensitive adhesive comprises:

20 to 60 wt. % of at least one radiation-crosslinkable copolymer based on epoxidized polyolefin as component (A), wherein the epoxy groups are statistically distributed over the molecular chain, 25 to 65 wt. % of at least one tackifying resin from the group of terpene hydrocarbons as component (B), which is free of epoxy groups, 5 to 15 wt. % of at least one oligomeric compound that in the cationic polymerization of component (A) exhibits reactive groups as component (C1), (C2) and/or (C3), 0.3 to 5 wt. % of at least one photo initiator as component (D), as well as optional additional additives.

A further preferred embodiment of an inventive hot melt pressure sensitive adhesive comprises olefinic double bonds in component (A) and component (B) as well as additionally a radical polymerization initiator.

The inventive hot melt pressure sensitive adhesive is generally manufactured by mixing. For this the unreactive components such as plasticizers, waxes and resins can be premixed at e.g. 80° C. to 200° C., more particularly at approximately 130° C., to form a homogeneous melt. Then the heat sensitive components, such as component (A), optionally component (C), photo initiators, photo sensitizers are added with stirring and stirred until homogeneity.

However, other process methods are also conceivable. Care has to be taken to homogenize the components under the lowest possible thermal stress. After the completely homogenized composition has been introduced into suitable containers, it is left to cool, solidifying in the process.

The hot melt pressure sensitive adhesives according to the invention are used to bond substrates as glass, coated or uncoated paper or corresponding cardboards and, above all, plastics such as, for example, PET, PEN, PP, PVC, PS and PE. The hot melt pressure sensitive adhesives according to the invention are characterized in particular by very good adhesion to the abovementioned plastics.

A preferred application form of the inventive hot melt pressure sensitive adhesives is the adhesion of hollow objects to labels, especially heat shrinkable labels.

Examples of hollow containers are bottles, cans, drums, tubes or cartridges. They can be rotationally symmetrical objects but angular hollow bodies are also possible. They consist, for example, of metal, glass or thermoplastic plastics. Polar plastics, especially polyesters, are preferred. Hollow objects of this type are used, e.g., for mineral water and soft drinks. Generally, the labels consist of thermoplastic plastics, such as polyethylene, polypropylene, polystyrene, polyvinyl chloride or cellophane. It is preferred to use labels of a film based on nonpolar plastics, more particularly oriented polypropylene (OPP). The shape of the labels does not have to meet any particular requirements. The labels are preferably wrap-around labels.

A further use of the hot melt pressure-sensitive adhesives according to the invention is for labeling aerosol cans or contour bottles with subsequent shrinking on of the labels. In general, the shrinkable labels are shrunk onto the contour of, e.g., an aerosol can in a few seconds at temperatures of at least 120° C., mostly above 150° C. Particularly for overlap bonding, the hot melt pressure sensitive adhesive according to the invention exhibits a very low tendency to creep together with good adhesion strength of the overlap bond. Moreover, the heat deflection temperature of the inventive hot melt pressure sensitive adhesive is improved. Accordingly, the overlapping bonded label will not shift during any dimensional changes caused by shrinking on the labels. Problems such as, for example, contamination of the adhesive layer exposed by the shift are thus prevented. Through the use of the hot melt pressure sensitive adhesives according to the invention, neither the pick-up bond nor the overlap bond is broken, nor is there any shift of the overlapping bond.

For problem-free processing, the hot melt pressure sensitive adhesives according to the invention should have a suitably low viscosity before their exposure to radiation. At 130° C., their viscosity is usually in the range 100 mPas to 4500 mPas. For certain processing methods a viscosity of up to 2500 mPas is particularly suitable, in particular in the range 200 mPas to 1000 mPas, measured with a Brookfield viscosimeter V 2+, spindle 27. A low viscosity is required for use in high speed labeling lines.

The hot melt pressure sensitive adhesives according to the invention have the necessary low viscosity at low processing temperatures which is required, for example, for their use on temperature-sensitive labels, e.g. for plastic labels made of OPP. The processing temperatures are in the range 50° C. to 150° C., preferably in the range 90° C. to 130° C. The low viscosity also guarantees the clean operation of commercially available labeling machines. Contamination, for example in the form of stringing and spatters, is avoided in particular in high-speed machines (more than 30,000 hollow containers/h). The high tackiness ensures safe pick-up and unloading of the labels in high-speed machines.

Processing is carried out on labeling machines that apply the hot melt pressure sensitive adhesive onto the label or onto the hollow container by means of segments, rollers or nozzles. In general, the adhesive is applied in such a way that a pick-up zone (label on hollow container) and an overlap zone (label end on beginning) exist. The hot melt pressure sensitive adhesive according to the invention can be used both as a pick-up adhesive and as an overlap adhesive. This simplifies the labeling process.

After the hot melt pressure sensitive adhesive according to the invention has been applied and the parts to be bonded have been joined together, for example, label to hollow container, the hot melt pressure sensitive adhesive according to the invention is exposed to a suitable dose of UV radiation or electron beams in order to provide an adequate adhesion and to bond the substrates. The irradiation time should be less than 5 seconds. Transparent labels, or those that are at least penetrable by UV at the zone of adhesion, are preferably used for the irradiation by UV radiation.

In a preferred embodiment, after the crosslinking reaction, the applied and bonded labels together with the object are brought for a short time in an oven in order to bring the label to the temperature required for shrinking. During this thermal treatment, the hot melt pressure sensitive adhesive shows excellent tensile strength properties with the result that a separation or shift at the overlapping area of the label does not occur. High ultimate adhesion and heat resistance are achieved through crosslinking induced by the radiation, which, for example, open up the following applications in the labeling field:

Labeling of containers such as aerosol cans or contour bottles with subsequent shrinking-on of the labels. The hot melt pressure sensitive adhesives used in accordance with the invention are characterized not only by the high heat deflection temperature, but also, and in particular, by a high cohesion and adhesion;

Labeling to produce the properties of a tamper evident closure. On account of the high adhesion, labels can mostly only be opened by tearing;

Labeling with stringent demands on the storage stability of the labeled goods, e.g., at increased temperature;

Labeling with subsequent pasteurization, for example using superheated steam. By virtue of the high heat deflection temperature of the bond, any residual heat present is also not a problem; and Heat stress occurring during processing can be easily and safely overcome without any adverse effect on the bond.

Additionally, and in particular, shrinkable films that enclose a packaged object can also be glued with an inventive adhesive and then subjected to a shrink process, for example, the shrink-wrapping of trays.

The invention finds quite general use in the manufacture of disposable articles (hygiene articles) or in packaging technology, especially for labeling during shrink fitting.

A further use of the hot melt pressure sensitive adhesives in accordance with the invention is the coating of pressure sensitive wrappers and tapes with an adhesive layer. These tapes or films, for example, based on polyolefins, are coated with the inventive adhesive and crosslinked by radiation. These objects can then be assembled. Permanent adhesive films and tapes can be manufactured in this way.

A further application area of the present invention is a use for manufacturing self-adhesive labels. In this case these labels are coated with an inventive adhesive and radiation crosslinked. The resulting self-adhesive surfaces can be covered with an anti-adhesively coated backing film. Self-adhesive labels are obtained.

A further form of use is for the manufacture of medical materials. For example, the adhesive surfaces of band-aids or other self-adhesive substrates can be coated with an inventive adhesive.

After crosslinking, the inventive hot melt adhesives exhibit an improved adhesive strength. The resulting network is evenly formed and thus affords improved adhesion and cohesion over a broad range of temperatures.

The subject of the invention is intended to be described in more detail by reference to the following examples.

EXAMPLES

List of Components

| | |
|---|---|
| Kuraray KL 610 | epoxidized polyisoprene homopolymer (Kuraray) |
| Kuraray KL 630 | epoxidized polyisoprene homopolymer (Kuraray) |
| Escorez 5400/5380 1:1 | Tackifier resin; resin based on polycyclopentadiene (Exxon) |
| Pionier 0352 | Mineral oil, plasticizer |
| Kraton D KX-222 | Polyethylene/polybutylene copolymer (Shell) |
| Masterbatch (no. 111456) | Photo initiator mixture with plasticizer (1:9) from p-thiophenoxyphenyl-diphenylsulfonium hexafluoroantimonate and sulfonium-(thiodi-4,1-phenylene)-bis-[diphenyl-bis[OC-6-11) hexafluoroantimonate in propylene carbonate and hydrogenated butadiene-Isoprene copolymer (Roll Isola). |
| Deuteron UV 1240 | Photo initiator mixture with plasticizer of bis-(dodecylphenyl)-iodonium hexafluoroantimonate in propylene carbonate (Deuteron) |
| Irganox 1010 | commercial stabilizer (Ciba) |
| Irganox HP2225 FF | commercial stabilizer (Ciba) |

Production Process:

A mixture of the ingredients 1-5 was prepared in a commercial laboratory mixer at 130° C. and stirred until homogeneous. The product was then left to cool in the absence of light.

Example 1

| | |
|---|---|
| 1) Irganox HP 2225 FF | 0.15% |
| 2) Pionier 0352 | 5.00% |
| 3) Escorez 5400:5380 (50:50) | 53.35% |
| 4) Kuraray KL 610 | 36.5% |
| 5) Masterbatch | 5% |

Viscosity:

| | |
|---|---|
| 120° C.: | 1015 (mPas) |
| 130° C.: | 722 (mPas) |
| 140° C.: | 532 (mPas) |

Example 2

| | |
|---|---|
| 1) Irganox HP 2225 FF | 0.15% |
| 2) Pionier 0352 | 5.00% |
| 3) Escorez 5400:5380 (50:50) | 53.35% |
| 4) Kuraray KL 630 | 36.5% |
| 5) Masterbatch | 5% |

Viscosity:

| | |
|---|---|
| 120° C.: | 1115 (mPas) |
| 130° C.: | 805 (mPas) |
| 140° C.: | 582 (mPas) |

Example 3

| | |
|---|---|
| 1) Irganox HP 2225 FF | 0.15% |
| 2) Pionier 0352 | 6.00% |
| 3) Escorez 5400:5380 (50:50) | 50.35% |
| 4) Kuraray KL 610 | 32.5% |
| 5) Kraton KX-222 | 6.00% |
| 6) Masterbatch | 5% |

Viscosity:

| | |
|---|---|
| 120° C.: | 6850 (mPas) |
| 130° C.: | 3900 (mPas) |
| 140° C.: | 2650 (mPas) |

Example 4

| | |
|---|---|
| 1) Irganox 1010 | 0.15% |
| 2) Pionier 0352 | 5.00% |
| 3) Escorez 5400:5380 (1:1) | 50.35% |
| 4) Kuraray KL 610 | 36.5% |
| 5) Masterbatch | 5% |

Viscosity:

| | |
|---|---|
| 120° C.: | 1020 (mPas) |
| 130° C.: | 700 (mPas) |

Example 5

| | |
|---|---|
| 1) Irganox HP 2225 | 0.15% |
| 2) Pionier 0352 | 5.00% |
| 3) Escorez 5400:5380 (50:50) | 53.35% |
| 4) Kuraray KL 610 | 40.5% |
| 5) Deuteron UV 1240 | 1% |

Viscosity:

| | |
|---|---|
| 120° C.: | 1050 (mPas) |
| 130° C.: | 722.5 (mPas) |
| 140° C.: | 532 (mPas) |

Test Method:

An inventive adhesive was applied in stripes onto one end of a transparent OPP film (Exxon Mobil 50 LR 210) at ca. 120-130° C. This end was glued onto a cleaned aluminum can. The adhesive was then applied in the same way in stripes onto the other side of the film and the overlap (approximately 1 cm) bonded. The labeled can was then irradiated on the adhesion seam with a UV device, type Fusion F-600 with an H-irradiator (240 watt/cm) at a line speed of 25 m/min. The distance from the substrate was 10 cm. The overlap of the seam was then marked and subsequently shrunk in a circulating air oven at 120° C. It was then determined at constant intervals (5 minutes) whether the adhesive withstood the forces resulting from the shrink process. This was determined by a shift of the overlap marking.

The resulting test specimens were stored in the dark when they were not immediately tested.

All the adhesives that were applied and tested in examples 1 to 5 showed a good stability, the overlap did not shift after a stress of 30 minutes in the circulating air oven.

Viscosity Measurements:

Viscosities were measured with a Brookfield DV2+ at the indicated temperature, spindle 27, according to ASTM D 3236-88.

The disclosures of each patent, patent application, and publication cited or described in this document are hereby incorporated herein by reference, in their entireties.

Various modifications of the invention, in addition to those described herein, will be apparent to those skilled in the art from the foregoing description. Such modifications are also intended to fall within the scope of the appended claims.

What is claimed:

1. A radiation crosslinkable hot melt pressure sensitive adhesive, comprising:
    15 to 89.99 wt. % of at least one linear radiation crosslinkable polymer as component (A) comprising a plurality of epoxy groups, wherein the epoxy groups are statistically distributed over the length of said radiation crosslinkable polymer, wherein component (A) does not include star-shaped polymers, wherein at least 75% of component (A) is an epoxidized butadiene homopolymer, an epoxidized isoprene homopolymer, an epoxidized butadiene copolymer, an epoxidized isoprene copolymer, or mixtures thereof, and wherein said polymer does not include terminal —OH groups;
    10 to 85 wt. % of at least one tackifying resin possessing no epoxy groups as component (B);
    0 to 20 wt. % of at least one low molecular weight oligomer as component (C), wherein the oligomer possesses reactive groups that can react with the epoxy groups of component (A); and
    0.01 to 30 wt. % of at least one additive comprising a photo initiator as component (D).

2. The adhesive of claim 1, wherein component (A) comprises 0.1 to 20 meq/g of epoxy groups.

3. The adhesive of claim 2, wherein component (A) comprises 0.2 to 15 meq/g of epoxy groups that are statistically distributed over the chain length.

4. The adhesive of claim 1, wherein the molecular weight of component (A) is in the range of 1000 to 100,000 g/mol.

5. The adhesive of claim 1, wherein component (A) is free from —OH groups.

6. The adhesive of claim 1, wherein component (C) comprises 5 to 15 wt. % of at least one oligomeric compound with a molecular weight of less than 1000 g/mol, wherein the oligomeric compound possesses functional groups that are reactive towards the epoxy groups of component (A).

7. The adhesive of claim 6 wherein the functional groups that are reactive towards the epoxy groups of component (A) are epoxy or OH groups.

8. The adhesive of claim 1 wherein component (D) further comprises a sensitizer, plasticizer, stabilizer, wax, adhesion promoter, or mixtures thereof.

9. The adhesive of claim 1, wherein the photo initiator is comprised of at least one radiation-sensitive initiator for cationic polymerization.

10. The adhesive of claim 9, additionally comprising at least one radical initiator.

11. The adhesive of claim 1, wherein component (B) comprises 25 to 65 wt. % of at least one tackifying resin.

12. The adhesive of claim 1 wherein component (D) further comprises 3 to 20 wt. % of at least one plasticizer.

13. The adhesive of claim 1, wherein the viscosity at 130° C. is less than 4500 mPas.

14. The adhesive of claim 13, wherein the viscosity at 130° C. is less than 1000 mPas.

15. A process for adhering labels to packaging, comprising applying the adhesive of claim 1 to both ends of a label;
    adhering the label on and around a package, wherein part of the label coated with the adhesive overlaps another part of the label;
    irradiating the adhesive for crosslinking; and
    shrinking the label onto the package.

16. The process of claim 15, wherein the packaging has a rotationally symmetrical shape.

17. The process of claim 15, wherein the irradiation is carried out by UV light or electron beam.

18. The process of claim 15, wherein the adhesive is applied at an application temperature of up to 130° C.

19. A process for manufacturing self-adhesive tapes, films or labels, comprising
    applying the adhesive of claim 1 to a tape, film or label;
    irradiating the adhesive for crosslinking; and
    covering the adhesive tape, film, or label with an anti-adhesive backing film.

* * * * *